United States Patent [19]

Inoue et al.

[11] Patent Number: 5,550,096
[45] Date of Patent: Aug. 27, 1996

[54] CATALYST FOR PURIFYING NITROGEN OXIDES FROM EXHAUST AND WASTE GASES

[75] Inventors: Akira Inoue, Hirakata; Motonobu Kobayashi, Takarazuka; Tetsuji Ono, Amagasaki, all of Japan

[73] Assignee: Nippon Shokubai Koguko Kogyo Co., Ltd., Osaka, Japan

[21] Appl. No.: 385,896

[22] Filed: Feb. 9, 1995

Related U.S. Application Data

[63] Continuation of Ser. No. 243,959, May 17, 1994, abandoned, which is a continuation of Ser. No. 132,839, Oct. 7, 1993, abandoned, which is a continuation of Ser. No. 22,328, Feb. 25, 1993, abandoned, which is a continuation of Ser. No. 877,151, May 1, 1992, abandoned, which is a continuation of Ser. No. 767,991, Sep. 30, 1991, abandoned, which is a continuation of Ser. No. 519,098, May 3, 1990, abandoned, which is a continuation of Ser. No. 418,645, Oct. 10, 1989, abandoned, which is a continuation of Ser. No. 319,918, Mar. 6, 1989, abandoned, which is a continuation of Ser. No. 208,651, Jun. 20, 1988, abandoned, which is a continuation of Ser. No. 114,554, Oct. 29, 1987, abandoned, which is a continuation of Ser. No. 15,501, Feb. 6, 1987, abandoned, which is a continuation of Ser. No. 858,071, Apr. 22, 1986, abandoned, which is a continuation of Ser. No. 660,850, Oct. 15, 1984, abandoned.

[30] Foreign Application Priority Data

Oct. 21, 1983 [JP] Japan ................................. 58-196023

[51] Int. Cl.$^6$ .................................................. B01J 27/053
[52] U.S. Cl. .................. 502/217; 423/213.2; 423/213.5; 423/239.1; 502/216
[58] Field of Search ..................... 502/217, 216; 423/239.1, 213.5, 213.2

[56] References Cited

U.S. PATENT DOCUMENTS

| | | | |
|---|---|---|---|
| 3,067,127 | 12/1962 | Plank et al. | 502/217 |
| 3,159,569 | 12/1964 | Hansford | 502/217 |
| 4,221,768 | 9/1980 | Inoue et al. | 423/239 |
| 4,233,183 | 11/1980 | Inaba et al. | 252/432 |

FOREIGN PATENT DOCUMENTS

| | | |
|---|---|---|
| 5044-306 | 3/1980 | Japan . |
| 8151-327 | 2/1983 | Japan . |
| 8026-826 | 2/1983 | Japan . |

*Primary Examiner*—Asok Pal
*Attorney, Agent, or Firm*—Omri M. Behr, Esq.

[57] ABSTRACT

A catalyst for the purification of an exhaust gas by the removal, through selective reduction, of nitrogen oxides present in the exhaust gas, which comprises (A) 80 to 95% by weight of a sulfur oxide-containing catalytic oxide obtained by thermally treating at least one hydrous oxide compound selected from the group consisting of binary hydrous oxide compound of titanium and silicon, binary hydrous oxide compound of titanium and zirconium and ternary hydrous oxide compound of titanium, zirconium and silicon in the presence of at least one sulfur compound selected from the group consisting of sulfuric acid and ammonium sulfate, (B) 0 to 5% by weight of a catalytic oxide comprising vanadium oxide, (C) 1 to 15% by weight of a catlytic oxide comprising the oxide of at least one metal selected form the group consisitng of tungsten, molybdenum, tin and cerium.

12 Claims, No Drawings

CATALYST FOR PURIFYING NITROGEN OXIDES FROM EXHAUST AND WASTE GASES

This application is a continuation of application Ser. No. 08/243,959 filed May 17, 1994, now abandoned, which in turn is a continuation of application Ser. No. 08/132,839 filed Oct. 7, 1993, now abandoned, which in turn is a continuation of application Ser. No. 08/022,328 filed Feb. 25, 1993, now abandoned, which in turn is a continuation of application Ser. No. 07/877,151 filed May 1, 1992, now abandoned, which in turn is a continuation of application Ser. No. 07/767,991 filed Sept. 30, 1991, now abandoned, which in turn is a continuation of application Ser. No. 07/519,098 filed May 3, 1990, now abandoned, which in turn is a continuation of application Ser. No. 07/418,645 filed Oct. 10, 1989, now abandoned, which in turn is a continuation of application Ser. No. 07/319,918 filed Mar. 6, 1989, now abandoned, which in turn is a continuation of application Ser. No. 07/208,651 filed Jun. 20, 1988, now abandoned, which in turn is a continuation of application Ser. No. 07/114,554 filed Oct. 29, 1987, now abandoned, which in turn is a continuation of application Ser. No. 07/015,501 filed Feb. 6, 1987, now abandoned, which in turn is a continuation of application Ser. No. 06/858,071 filed Apr. 22, 1986, now abandoned, which in turn is a continuation of application Ser. No. 06/660,850 filed Oct. 15, 1984, now abandoned.

BACKGROUND OF THE INVENTION

1. Field of the Invention

This invention relates to catalysts for purifying exhaust and waste gases by the removal therefrom of nitrogen oxides. Particularly, it relates to catalysts for purifying exhaust and waste gases emanating from boilers and other similar stationary combustors at thermal power plants, iron foundries and other various plants by the removal of nitrogen oxides (mainly NO and $NO_2$; hereinafter referred to as "$NO_x$"). More particularly, it relates to catalysts which, in the treatment of an exhaust gas containing $NO_x$ and sulfur oxides (containing mainly sulfur dioxide; hereinafter referred to as "$SO_x$") with ammonia added thereto as a reducing agent, enable $NO_x$ to be efficiently decomposed into harmless nitrogen and water and, at the same time, substantially curb the oxidation of sulfur dioxide into sulfur trioxide. Moreover, these catalysts enjoy high durability.

2. Description of Prior Art

Heretofore, for the removal of $NO_x$ from the exhaust gas, there have been developed an adsorption method, an absorption method and a catalytic reduction method. Among other methods, the catalytic reduction method particularly suits the treatment of a large volume of exhaust gas. Among other versions of the catalytic reduction method, the version which effects catalytic reduction of $NO_x$ selectively to $N_2$ by the addition of ammonia as a reducing agent has been reported to excel in performance. The question encountered by this version is whether or not there can be obtained a catalyst which befits the composition and behavior of the particular exhaust gas to be treated.

The requirements to be fulfilled by the catalyst usable for this method are firstly that the catalyst should be insusceptible to oxygen, $SO_x$, carbon dioxide, carbon monoxide, steam, halides, hydrocarbons, etc. which coexist in the exhaust gas, secondly that it should produce ample performance at high space velocity in a wide range of temperatures, thirdly that it should not be deprived of activity by the deposition thereon of soot which accompanies the exhaust gas and contains heavy metals such as vanadium, nickel and iron and alkali metals such as sodium and potassium, and fourthly that it should be incapable of substantially oxidizing sulfur dioxide in the exhaust gas into sulfur trioxide. The sulfur dioxide contained in the exhaust gas is normally oxidized into sulfur trioxide on a catalyst. As the sulfur trioxide accumulates on the catalyst, it deprives the catalyst of its $NO_x$ removal activity or reacts with ammonia serving as a reducing agent to give rise to ammonium sulfate and ammonium hydrogen sulfate. When these ammonium salts accumulate in various devices such as a smoke stack or a heat exchanger, they eventually come to impede smooth operation of such devices. Thus, the oxidation of the sulfur dioxide into sulfur trioxide is desired to be curbed by all means. The catalyst for $NO_x$ removal from the exhaust gas is required to possess properties enough to fulfil the four requirements described above.

Heretofore, as a catalyst for $NO_x$ removal, an iron-titanium oxide type catalyst containing not more than 8% by weight of iron as FeO based on the total amount of the catalyst which is obtained by treating a high-titanium slag containing 2 to 8% by weight of iron as FeO with sulfuric acid under application of heat, optionally filtering the resultant solution and discarding the filtrate, neutralizing the solids resulting from the treatment of high-titanium slag with sulfuric acid, drying the neutralized solids and calcinating (U.S. Pat. No. 4,036,785) has been known to the art. This catalyst, however, has a disadvantage that the $NO_x$ removal efficiency is low and the service life is insufficient.

A catalyst which has as its catalytically active component a mixed composition obtained by mixing titanium dioxide with at least one member selected as a second component from the group consisting of the oxides of copper, nickel and cobalt at an atomic ratio in the range of 0.01 to 1 based on titanium has been also known to the art (U.S. Pat. No. 4,085,193). Again this catalyst has a disadvantage that the activity is low and the service life is still insufficient.

We have already disclosed in U.S. Pat. No. 4,221,768 a catalyst which has high $NO_x$ removal ability, possesses satisfactory durability and minimally oxidizes sulfur dioxide. We have learnt, however, that the treatment of an exhaust gas from a boiler burning coal or an exhaust gas from a boiler burning heavy oil of high sulfur content necessitates use of a catalyst which is much less active in the oxidation of sulfur dioxide and more effective in $NO_x$ removal from the exhaust gas.

The results of our study reveal that vanadium oxide present in the catalyst brings about an outstanding activity in $NO_x$ removal from the exhaust gas and, in the meantime, constitutes itself a major cause for enhancing the oxidation of sulfur dioxide. The ability of this catalyst to oxidize sulfur dioxide can be lowered by decreasing the vanadium oxide content thereof, though inevitably with a proportional sacrifice of the ability to remove $NO_x$. It has, thus, become necessary to study various catalyst compositions in search of a catalyst composition which is capable of providing high $NO_x$ removal ability at a lower vanadium oxide content.

An object of this invention, therefore, is to provide a novel catalyst for purifying an exhaust gas by the removal of nitrogen oxides.

Another object of this invention is to provide a catalyst which, in the treatment of an exhaust gas containing both $NO_x$ and $SO_x$ with ammonia added thereto as a reducing agent, enables $NO_x$ to be decomposed effeiciently into harmless nitrogen and water and, at the same time, substantially curbs the oxidation of sulfur dioxide into sulfur trioxide while exhibiting outstanding durability.

SUMMARY OF THE INVENTION

The objects described above are accomplished by a catalyst for the purification of an exhaust gas by the removal, through selective reduction, of nitrogen oxides present in the exhaust gas, which comprises (A) 80 to 95% by weight of a sulfur oxide-containing catalytic oxide obtained by thermally treating at least one hydrous oxide compound selected from the group consisting of binary hydrous oxide compounds of titanium and silicon, binary hydrous oxide compounds of titanium and zirconium and ternary hydrous oxide compounds of titanium, zirconium and silicon in the presence of at least one sulfur compound selected from the group consisting of sulfuric acid and ammonium sulfate, (B) 0 to 5% by weight of a catalytic oxide comprising vanadium oxides, (C) 1 to 15% by weight of a catalytic oxide comprising at least one oxide of metal selected from the group consisting of tungsten, molybdenum, tin and cerium.

DESCRIPTION OF PREFERRED EMBODIMENTS

Generally the binary composite oxide consisting of titanium and silicon (hereinafter referred to as $TiO_2$-$SiO_2$ for short) is known, as introduced by Ito, M., Hattori, H. and Tanabe, K., J. Catal., 35, 225–231(1974), to be a solid acid which exhibits a conspicuous acidity not observed in either of the oxides of the component elements and possesses a large surface area.

$TiO_2$-$SiO_2$ is not a mere mixture of titanium oxide with silicon oxide but is instead a so-called binary composite oxide formed jointly by titanium and silicon. This fact seems to account for the specific properties manifested by $TiO_2$-$Si_{O2}$. The binary composite oxide consisting of titanium and zirconium (hereinafter referred to as $TiO_2$-$ZrO_2$ for short) and the ternary composite oxide consisting of titanium, zirconium and silicon (hereinafter referred to as $TiO_2$-$ZrO_2$-$SiO_2$ for short) are identifiable as composite oxides possessing properties similar to the properties of $TiO_2$-$SiO_2$.

It has been already disclosed in U.S. Pat. No. 4,221,768 that when these composite oxides are used as components for a catalyst, the produced catalyst has high $NO_x$ removal activity, low ability to oxidize $SO_2$ and outstanding durability.

We have now found that a catalyst which has very high $NO_x$ removal activity, low ability to oxidize $SO_2$ and outstanding thermal resistance, durability and good moldability is produced by using, as catalyst components, such sulfur-containing composite oxides which are obtained by thermally treating the hydrous oxide compounds, namely the precursors of the aforementioned $TiO_2$-$SiO_2$, $TiO_2$-$ZrO_2$ and $TiO_2$-$ZrO_2$-$SiO_2$ before the step of calcination, in the presence of sulfuric acid and/or ammonium sulfate compound at 450° to 700° C. ( hereinafter referred to respectively as $TiO_2$-$SiO_2$-S, $TiO_2$-$ZrO_2$-S and $TiO_2$-$ZrO_2$-$SiO_2$-S).

$TiO_2$-$SiO_2$-S, $TiO_2$-$ZrO_2$-S and $TiO_2$-$ZrO_2$-$SiO_2$-S which make up the catalytic oxide (A), one of the components of the catalyst of this invention possess properties as solid acids similar to the aforementioned $TiO_2$-$SiO_2$, $TiO_2$-$ZrO_2$ and $TiO_2$-$ZrO_2$-$SiO_2$. They have large surface area and, by X-ray diffraction analysis, are found to possess an amorphous structure substantially.

Particularly they have been recognized to have a solid acid distribution liable to involve fewer acid points of strong acidity and more acid points of relatively weak acidity than $TiO_2$-$SiO_2$, $TiO_2$-$ZrO_2$ and $TiO_2$-$ZrO_2$-$SiO_2$.

The presence of acid points of strong acidity in the catalyst is believed to impede the reaction of $NO_x$ removal because these acid points strongly adsorb ammonia excessively. It is, therfore, believed that the adsorption of ammonia to the catalyst surface can be suitably controlled and the catalyst's $NO_x$ removal acitivity can be improved selectively by using as components for the catalyst those composite oxides having a desirable solid acid distribution.

As the result, the specific properties of the aforementioned sulfur-containing composite oxides produced by thermally treating the hydrous oxide compounds, the precursors of $Ti_O$-$SiO_2$, $TiO_2$-$ZrO_2$ and $TiO_2$-$ZrO_2$-$SiO_2$ before the step of calcination in the presence of sulfuric acid and/or an ammonium sulfate compound are believed to confer highly desirable functions upon the produced catalyst.

If silica sol is used as a binder in the integral molding of titanium oxide powder with an aqueous solution containing such active components as vanadium and tungsten, there is observed a trend that an increase in the silica content will lower the $NO_x$ removal activity seriously. When $SiO_2$ is present in the form of $TiO_2$-$SiO_2$-S as $TiO_2$-$SiO_2$-S in the catalyst oxide (A) of the catalyst of the present invention, an increase in the $SiO_2$ content hardly results in a decrease of the $NO_x$ removal activity, and it rather suppresses sulfur dioxide oxidation activity. Thus, the catalyst of this invention exhibit its outstanding $NO_x$ removal ability stably in a wide range of $SiO_2$ content.

Further, since the catalyst of the present invention uses $TiO_2$-$SiO_2$-S, $TiO_2$-$ZrO_2$-S and $TiO_2$-$ZrO_2$-$SiO_2$-S which possess a large surface area and enjoys high thermal stability, such active components as vanadium oxide, tungsten oxide and the like are stably retained in a highly dispersed state. The catalyst of this invention, therefore, offers higher resistance to heat than the catalyst containing vanadium oxide, tungsten oxide, titanium oxide, etc. (even if these components are mixed very homogeneously as by the coprecipitation method). When it is used for a long time at elevated temperatures, for example, the active components are hardly sintered by the heat and the catalyst has its physical properties affected minimally. Moreover, the catalyst enjoys a characteristic feature that it exhibits high $NO_x$ removal activity and possesses low ability to oxidize sulfur dioxide despite its relatively low vanadium oxide content.

The advantage of using the aforementioned $TiO_2$-$SiO_2$-S, $TiO_2$-$ZrO_2$-S and $TiO_2$-$ZrO_2$-$SiO_2$-S as the catalytic oxide (A) resides in the fact that the catalyst of this invention exhibits resistance to acids, refrains from yielding to the action of $SO_x$ and halide, manifests stable $NO_x$ purifying ability for a long time, and it makes possible to obtain good quality of product by mass production in high yield because of excellent moldability. In atomic percentage, the catalytic oxide (A) is desired to be composed of 40 to 95%, preferably 50 to 90%, of titanium, 5 to 60%, preferably 10 to 50%, of silicon and/or titanium, and 1.2 to 7%, preferably 1.5 to 5%, of sulfur. The $NO_x$ removal activity of the catalyst is insufficient if titanium accounts for less than 40% and silicon and/or zirconium account for 60% or more. If titanium accounts for more than 95% and silicon and/or zirconium accounts for less than 5%, the ability to oxidize $SO_2$ is enhanced to an undesirable extent. In the aforementioned atomic percentages, the total of titanium and silicon and/or zirconium and sulfur is 100.

If sulfur accounts for less than 1.2% in atomic percentage, there results an undesirable effect that no optimum solid acid distribution is obtained and the selective activity possessed by the catalyst of this invention is diluted. If sulfur accounts for more than 7%, the $NO_x$ removal activity at lower temperatures below 300° C. is insufficient and the moldability of the catalyst is inferior. Thus, the sulfur content of the catalyst in atomic percentage is desired to fall in the range of 1.2 to 7%.

If the temperature at which the thermal treatment is performed in the presence of sulfuric acid and/or ammonium sulfate compound is lower than 450° C., the catalyst of this invention offers inferior resistance to heat. If this temperature exceed 700° C., there ensues an undesirable effect that the solid acidity is degraded and the ability to oxidize $SO_2$ is enhanced. Thus, this temperature is desired to fall in the range of 450° to 700° C., preferably in the range of 500° to 650° C.

The aforementioned sulfur-containing composite oxides to be used in the catalyst of the present invention are each desired to possess an amorphous structure or a crystalline structure approaching an amorphous structure as determined by the X-ray diffraction and a BET (Brunauer-Emmett-Teller) surface area of not less than 60 $m^2/g$, preferably in the range of 80 to 250 $m^2/g$.

In the preparation of the aforementioned sulfur-containing composite oxides to be used in the present invention, a titanium source may be selected from among inorganic titanium compounds such as titanium chloride, titanium sulfate and titanium hydroxide and organic titanium compounds such as titanium oxalate and tetraisopropyl titanate, a silicon source from among inorganic silicon compounds such as colloidal silica, water glass and silicon tetrachloride and organic silicon compounds such as ethyl silicate, a zirconium source from amoung inorganic zirconium compounds such as zirconium chloride, zirconium-oxychloride, zirconium sulfate, zirconium oxysulfate and zirconium oxalate and tetraisopropyl zirconate, and an ammonium sulfate compound from among ammonium sulfate, ammonium hydrogen sulfate and ammonium sulfite.

The $TiO_2$-$SiO_2$-S is prepared advantageously by a procedure which comprises neutralizing an aqueous ammonia solution containing silica sol with a sulfuric acid solution of titanyl sulfate or an aqueous solution of titanium tetrachloride thereby producing a precipitate, washing this precipitate and drying the cleaned precipitate at 100° to 250° C. thereby forming $TiO_2$-$SiO_2$ powder as a hydrous oxide compound, adding a prescribed amount of the $TiO_2$-$SiO_2$ powder to an aqueous solution of ammonium sulfate or an aqueous solution of sulfuric acid, thoroughly mixing the resultant combination, then immediately concentrating and drying the combination, and drying the combination, and subsequently calcining the combination at a temperature of 450° to 700° C.

This procedure is carried out specifically as follows. Either an aqueous sulfuric acid solution of titanyl sulfate or an aqueous titanium tetrachloride solution containing a prescribed amount of titanium is prepared in a concentration of 1 to 100 g/liter as titanium oxide. Separately, an aqueous solution of silica sol containing a prescribed amount of silica, by addition of ammonia of an amount required for neurtralization, is prepared in a concentration of 1 to 100 g/liter as silica. To this aqueous solution, while under agitation, the aforementioned aqueous solution of titanyl sulfate or aqueous solution of titanium tetrachloride is gradually added alnog with gradual liberation of the heat of neutralization to induce formation of a coprecipitate containing titanium and silicon. This coprecipitate is separated by filtration, washed and then dried at 100° to 250° C. for 1 to 10 hours, and pulverized. The dry $TiO_2$-$SiO_2$ powder thus produced generally contains 0.1 to 8% by weight of sulfur oxide as $SO_4^{-2}$ and 10 to 30% by weight of water when the sulfate solution of titanyl sulfate is used as the starting material. Since this sulfur component does not remain in a thoroughly stable state, the dry powder requires further addition of sulfuric acid or an ammonium sulfate compound. The $TiO_2$-$SiO_2$ hydrous oxide compound gives desirable results particularly when the sulfur oxide content falls in the range of 5 to 20% by weight, preferably in the range of 9 to 15% by weight, as $SO_4^{2-}$. Further, it may be prepared by incorporating a desired amount of sulfur compound to a slurry of a coprecipitated compound obtained by neutralization of ammonia.

Then, the dry powder of $TiO_2$-$SiO_2$ is calcined at 450° to 700° C. for 5 to 10 hours to obtain $TiO_2$-$SiO_2$-S powder containing a prescribed amount of sulfur. $TiO_2$-$ZrO_2$-S and $TiO_2$-$ZrO_2$-$SiO_2$-S are prepared similarly to $TiO_2$-$SiO_2$-S.

As regards the other catalytic oxide (B) and the catalytic oxide (C) which are used in conjunction with the sulfur-containing composite oxides such as $TiO_2$-$SiO_2$-S, the catalytic oxide (B) is a vanadium oxide and the catalytic oxide (C) is the oxide of at least one element selected from the group consisting of tungsten, molybdenum, tin and cerium. The starting material for the oxide may be suitably selected from among oxides, hydroxides, inorganic acid salts and organic acid salts, particularly ammonium salts, oxalates, nitrates, sulfates and halides.

The catalyst of this invention, by weight percentage, comprises 80 to 95%, preferably 85 to 95%, of the catalytic oxides (A), 0 to 5%, preferably 0 to 3%, of the catalytic oxide (B), and 1 to 15%, preferably 3 to 12%, of the catalytic oxide (C), naturally, the total of the catalytic oxides (A), the catalytic oxide (B), and the catalytic oxide (C) is 100%. If the catalytic oxide (B) accounts for a proportion exceeding 5%, there ensues an undesirable effect that the ratio of oxidation of sulfur dioxide increases and the catalyst, therefore, proves unfit for the $NO_x$ removal from an exhaust gas containing sulfur dioxide in a high concentration. If the proportion of the catalyst oxide (C) falls outside the aforementioned range, there ensues a disadvantage that the $NO_x$ removal activity is degraded or the cost of raw materials for the catalyst is heightened. Thus, this proportion is desired to fall in the range of 1 to 15%.

Now, a typical procedure to be adopted for the preparation of the catalyst contemplated by this invention will be cited below. Where the catalyst is to contain $TiO_2$-$SiO_2$-S, vanadium, and tungsten, prescribed amounts of ammonium metavanadate and ammonium para-tungstate are dissolved in an aqueous solution of monoethanolamine or oxalic acid. The resultant aqueous solution containing vanadium and tungsten is kneaded with the $TiO_2$-$SiO_2$-S powder prepared in advance by the aforementioned procedure and a molding aid and molded in the shape of honeycomb by an extrusion molder. The molder blend is dried at 50° to 120° C. and then calcined at 300° to 650° C., preferably 350° to 550° C., for 1 to 10 hours, current of air to produce a catalyst. Alternatively, this catalyst may be prepared by a procedure of preparatorily molding the $TiO_2$-$SiO_2$-S powder in the shape of honeycomb, calcining the $TiO_2$-$SiO_2$-S honeycomb, and impregnating the calcined $TiO_2$-$SiO_2$-S honeycomb with an aqueous solution containing vanadium and tungsten. Optionally, the preparation of the catalyst may involve use of a carrier. Examples of the carrier usable herein include alumina, silica, silica-alumina, bentonite, diatomaceous earth, silicon carbide, titania, zirconia, magnesia, cordierite, mullite, pumice, activated carbon and inorganic fibers. Such a carrier may be used as blended with the catalyst or as carrying the catalyst thereon. Of course, the preparation of the catalyst is not limited to these procedures.

The shape of the catalyst is not limited to the aforementioned honeycomb. It may be suitably selected from among various shapes including circular column, cylinder, plate, ribbon, corrugated plate, pipe, doughnut, lattice, and other one-piece objects.

As concerns the composition of the exhaust gas to be treated in the presence of the catalyst of this invention, the exhaust gas generally contains 10 to 2,000 ppm of $SO_x$, 1 to 20% by volume of oxygen, 1 to 15% by volume of carbon dioxide, 5 to 15% by volume of steam, 0.01 to 30 g of dust per $Nm^3$ and 50 to 1,000 ppm of $NO_x$ (mainly NO) on the average. The ordinary waste gas from the boiler has a composition in this range. This invention does not discriminate the exhaust gas particularly by its composition. This is because the catalyst of this invention is capable of effectively treating $NO_x$-containing exhaust gases containing no $SO_x$, $NO_x$-containing exhaust gases containing halogen compounds, and other special exhaust gases.

The conditions of the treatment are variable with the kind and behavior of the particular exhaust gas to be treated. First, the amount of ammonia ($NH_3$) to be added is desired to be 0.5 to 3 parts per part of $NO_x$. In the case of the exhaust gas from the boiler, for example, since the greater part of $NO_x$ is NO, the amount of ammonia to be added is desired to be such that the molar ratio of NO to $NH_3$ will fall in the neighborhood of 1:1. This is because special attention must to be otherwise paid to preventing excess $NH_3$ from being released in its unaltered form into the ambient air. Where the occurrence of excess $NH_3$ must be repressed to the fullest extent, the amount of ammonia to be added is desired to be such that the molar ratio of $NH_3$/NO will fall below 1. Then, the reaction temperature is desired to fall in the range of 150° to 550° C., preferably 200° to 450° C. The space velocity is advantageous in the range of 1,000 to 100,000 $hr^{-1}$, preferably 3,000 to 30,000 $hr^{-1}$. Although the pressure for the reaction is not specifically limited, it is desired to fall in the range of 0.01 to 10 $kg/cm^2$.

The shape of the reactor is not specifically defined. Generally, the reactor of fixed-bed type, moving-bed type or fluidized-bed type is utilized.

Now, the present invention will be described more specifically below with reference to working examples. It should be noted, however, that this invention is not limited only to these working examples.

EXAMPLE 1

$TiO_2$-$SiO_2$-S was prepared by the procedure described below.

As a titanium source, an aqueous sulfuric acid solution of titanyl sulfate having the following composition was used.

| | |
|---|---|
| $TiOSO_4$ (as $TiO_2$) | 250 g/liter |
| total $H_2SO_4$ | 1100 g/liter |

Separately, 400 liters of water was mixed with 286 liters of aqua ammonia ($NH_3$ 25%) and 24 kg of slica sol (a product having a $SiO_2$ content of about 30% by weight, manufacture by Nissan Chemical Kabushiki Kaisha and marketed under trademark designation of Snowtex-30) was added to the resultant solution. Into the solution thus obtained, a titanium-containing aqueous sulfuric acid solution obtained by diluting 153 liters of the aforementioned aqueous sulfuric acid solution of titanyl sulfate with 300 liters of water was gradually added dropwise while under agitation, to produce a coprecipitate gel. The solution containing the formed coprecipitate was thereafter left standing still for 15 hours. The $TiO_2$-$SiO_2$ gel thus obtained was separated by filtration, washed with water and then dried at 200° C. for 10 hours. The hydrous oxide compound of $TiO_2$-$SiO_2$ was found to contain 3.0% by weight of sulfur as $SO_4^{2-}$ and 16% by weight of water. Then, the hydrous oxide compound $TiO_2$-$SiO_2$ thus obtained was mixed thoroughly with 100 liters of an aqueous ammonium sulfate solution containing 3.1 kg of ammonium sulfate. The resultant mixture was concentrated, dried to hardness, and further calcined at 550° C. for 6 hours in an atomosphere of air. The powder consequently produced had a composition of Ti:Si:S=78.5:18.4:3.1 (atomic ratio) and a BET surface area of 180 $m^2$/g. The powder obtained here will be hereinafter referred to as TSS-1.

With 7 liters of water, 0.7 liter of monoethanolamine was mixed. In the resultant solution, 2.12 kg of ammonium para-tungstate was dissolved and then 0.468 kg of ammonium meta-vanadate was dissolved to obtain a homogeneous solution. With a kneader, this solution and 16 kg of the aforementioned TSS-1 were thoroughly mixed along with gradual addition of a suitable amount of water. The resultant blend was molded with an extrusion molder in the shape of a lattice 80 mm square in outside section, 4.0 mm square in mesh, 1.0 mm in wall thickness and 500 mm in length. The molded blend was dried at 60° C. and then calcined at 400° C. for 5 hours under a current of air. The produced catalyst had a composition of TSS-1:$V_2O_5$: $WO_3$=88:2:10 as oxides by weight ratio.

EXAMPLE 2

A $TiO_2$-$SiO_2$ hydrous oxide (having a water content of 19% by weight) was obtained by following the procedure of Example 1, except that 400 liters of an aqueous titanium tetrachloride solution containing 90.83 kg of titanium tetrachloride ($TiCl_4$) was used as a titanium source. The $TiO_2$-$SiO_2$ hydrous oxide thus obtained was stirred in 100 liters of an aqueous sulfutic acid solution containing 5.3% by weight of sulfuric acid. The resultant mixture was concentrated, dried to hardness, and further calcined at 550° C. for 6 hours in an atomosphere of air. The powder consequently obtained was found to have a composition of Ti:Si:S=78.4:18.8:2.8 (atomic ratio) and a BET surface area of 170 $m^2$/g. The powder obtained here will be hereinafter referred to as TSS-2. A lattice-shaped catalyst was prepared from the TSS-2 by following the procedure of Example 1. The produced catalyst had a composition of TSS-2:$V_2O_5$:$WO_3$= 88:2:10 as oxides by weight ratio.

EXAMPLE 3

$TiO_2$-$ZrO_2$-S was prepared by the procedure to be described below. In 1000 liters of water, 19.3 kg of zirconium oxychloride ($ZrOCl_2.8H_2O$) was dissolved. The resultant solution was thoroughly mixed with 78 liters of an aqueous sulfuric acid solution of titanyl sulfate of the same composition as used in Example 1. To the solution consequently formed, aqua ammonia was gradually added dropwise while under through agitation, with the temperature kept at about 30° C., until the pH value became 7. The mixture thus produced was then left standing still for 15 hours. The TiO$_2$-ZrO$_2$-S gel thus obtained was separated by filtration, washed with water and then dried at 200° C. for 10 hours. The produced TiO$_2$-SiO$_2$ hydrous oxide was thoroughly mixed with 100 liters of an aqueous ammonium sulfate solution containing 1.01 kg of ammonium sulfate, then concentrated, dried to hardness and calcined at 500° C. for 6 hours in an atmosphere of air. The produced powder had a composition of Ti:Zr:S=78.3:19.2:2.5 (atomic ratio) and a BET surface area of 140 m$^2$/g. The powder obtained here will be hereinafter referred to as TZS-1.

A lattice-shaped catalyst was produced from TZS-1 by following the procedure of Example 1. The completed catalyst had a composition of TZS-1:V$_2$O$_5$:WO$_3$=88:2:10 as oxides by weight ratio.

EXAMPLE 4

TiO$_2$-ZrO$_2$-SiO$_2$-S powder was prepared by following the procedures of Examples 1 and 3. The produced powder had a composition of Ti:Zr:Si:S=78.4:4.0:14.0:3.2 (atomic ratio) and a BET surface area of 170 m$^2$/g. The powder obtained here will be hereinafter referred to as TZSS-1.

A lattice-shaped catalyst was prepared from TZSS-1 by following the procudure of Example 1. The completed catalyst had a composition of TZSS-1:V$_2$O$_5$:WO$_3$=88:2:10 as oxides by weight ratio.

EXAMPLE 5

The catalyst obtained in Examples 1 through 4 were tested for NO$_x$ removal efficiency and conversion of SO$_2$ to SO$_3$ by the procedures described below.

A given lattice-shaped catalyst (4.0 mm in square mesh and 1.0 mm in wall thickness) was cut into 16 mm square in area and 500 mm in length. A stainless steel reaction tube 38 mm in inside diameter immersed in a molten salt bath was packed with the catalyst. A synthetic gas of the following composition resembling that of the exhaust gas of boiler was introuduced, as mixed with ammonia in the manner described below, into the catalyst bed at a flow rate of 0.894 Nm$^3$/hr (space velocity 7,000 hr$^{-1}$). In the ensuing reaction, the catalyst was tested for NO$_x$ removal efficiency at 300° to 380° C. and for conversion of SO$_2$ to SO$_3$ at 350° C.

| Gas composition | | | |
|---|---|---|---|
| NO | 200 ppm | CO$_2$ | 10% by volume |
| SO$_2$ | 800 ppm | H$_2$O | ca. 10% by volume |
| O$_2$ | 4% by volume | N$_2$ | Balance |
| NH$_3$ | 200 ppm | | |

The NO$_x$ removal efficiency was determined by measuring the NO$_x$ concentrations of the gas at the inlet and outlet of the catalyst bed with a NO$_x$ meter (chemilumin-escence type, produced by Kabushiki Kaisha Yanagimoto Seisakusho and marketed under trademark designation of ECL-7S ) and applying the results of measurement to the following formula.

$$\text{NO}_x \text{ removal efficiency (\%)} = \frac{\left(\text{NO}_x \text{ concentration at the inlet}\right) - \left(\text{NO}_x \text{ concentration at the outlet}\right)}{(\text{NO}_x \text{ concentration at the inlet})} \times 100$$

The SO$_2$ conversion was determined by first causing the total SO$_x$ in the exhaust gas at the outlet of the catalyst bed to be adsorbed by an aqueous 5% hydrogen peroxide solution for a fixed length of time therby collecting the total SO$_x$ in the form of an aqueous sulfuric acid solution, weighing out part of the aqueous solution with isopropyl alcohol, titrating the resultant mixture with an aqueous barium acetate solution adjusted in advance to a prescribed concentration with Arsenazo III as an indicator therby finding the concentration of total SO$_x$, then collecting the SO$_3$ in the exhaust gas as sulfuric acid by the method proposed in H. GOKSΦYR et al: J. Ins. Fuel., Vol 35, p. 177, 1961, finding the SO$_3$ concentration by the aforementioned method, and applying the results of measurement to the following formula.

$$\text{SO}_2 \text{ conversion (\%)} = \frac{(\text{SO}_3 \text{ concentration at the outlet})}{(\text{Total SO}_x \text{ concentration})} \times 100$$

The results are shown in Table 1.

TABLE 1

| Catalyst | NO$_x$ removal efficiency (%) at reaction temperature of | | | SO$_2$ conversion (%) at reaction temperature of |
|---|---|---|---|---|
| | 300° C. | 350° C. | 380° C. | 350° C. |
| Example 1 | 92 | 96 | 97 | 0.6 |
| Example 2 | 92 | 96 | 97 | 0.6 |
| Example 3 | 90 | 94 | 95 | 0.6 |
| Example 4 | 91 | 95 | 96 | 0.5 |

It is noted from the results given above that these catalysts possessed high NO$_x$ removal ability and low ability to oxidize SO$_2$, indicating that the catalyst of the present invention excels in performance.

EXAMPLES 6–11

Various TiO$_2$-SiO$_2$-S powders indicated in Table 2 were prepared by using catalytic oxides (A) of dissimilar compositions to produce catalysts having a fixed composition of (TiO$_2$-SiO$_2$-S):V$_2$O$_5$:WO$_3$=88:2:10 (weight ratio) by following the procedures of Examples 1 and 2. The results were tested for catalytic properties by following the procedure of Example 5.

The results are shown in Table 2.

EXAMPLE 12

A hydrous oxide compound TiO$_2$-SiO$_2$ was obtained by following the procedure of Example 1, except that 400 liters of an aqueous titanium tetrachloride solution containing 90.83 kg of titanium tetrachloride (TiCl$_4$) was used as a titanium source. It was then calcined at 550° C. for 6 hours in an atmosphere of air. The produced powder will be hereinafter referred to as TS-1. In 7 liters of water, 2.8 kg of oxalic acid and 2.12 kg of ammonium para-tungstate were dissolved and then 0.939 kg of vanadyl sulfate (VOSO$_4$.4H$_2$O) was dissolved to form a homogeneous solution. By mixing this solution with 16 kg of the aforementioned powder and processing the resultant mixture by following the procedure of Example 1, there was produced a lattice-shaped catalyst. The completed catalyst was found to have a composition of TS-1:V$_2$O$_5$:WO$_3$=88:2:10 as oxides by weight ratio. This catalyst was tested for catalytic properties by following the procefure of Example 5. The results are shown in Table 2.

EXAMPLE 13

Titanium hydroxide gel was obtained by adjusting 400 liters of an aqueous titanium tetrachloride solution containing 90.83 kg of titanium tetrachloride (TICl$_4$) to pH 7 by addition of aqua ammonia, separating the precipitate consequently formed in the solution by filtration, and washing the separated precipitate with water. Separately, 0.7 liter of monoethanolamine and 7 liters of water were mixed and 2.12 kg of ammonium paratungstate and 0.468 kg of ammonium meta-vanadate were dissolved in the resultant solution and, then, 24 kg of silica sol (product containing about 30% by weight of SiO$_2$, manufactured by Nissan Chemical Kabushiki kaisha and marketed under trademark designation of Snowtex-30) was added to produce a homogeneous solution. The aforementioned titanium hydroxide gel was thoroughly mixed with this solution. The resultant mixture was concentrated, dried to hardness, then dried at 200° C. for 10 hours, and subsequently clacined at 500° C. for 3 hours in an atmosphere of air. The catalyst powder so obtained was molded by following the procudure of Example 1 to produce a latticeshaped catalyst. The completed catalyst was found to have a composition of (TiO$_2$+SiO$_2$):V$_2$O$_5$:WO$_3$=88:2:10 as oxides by weight ratio. The catalyst was tested for catalytic properties by following the procedure of Example 5. The results are shown in Table 2.

TABLE 2

TiO$_2$—SiO$_2$—S composition

| Catalyst | Ti:Si:S (atomic ratio) | NO$_x$ removal efficiency (%) at reaction temperature of | | | SO$_2$ conversion (%) at reaction temperature of 350° C. |
|---|---|---|---|---|---|
| | | 300° C. | 350° C. | 380° C. | |
| Example 6 | 78.8:19.5:1.7 | 92 | 96 | 97 | 0.6 |
| Example 7 | 78.6:17.4:4.0 | 91 | 96 | 97 | 0.6 |
| Example 8 | 64.7:30.2:5.1 | 90 | 95 | 96 | 0.5 |
| Example 9 | 77.1:16.4:6.5 | 90 | 96 | 97 | 0.8 |
| Example 10 | 80.0:19.7:0.5 | 90 | 94 | 95 | 0.6 |
| Example 11 | 76.5:16.5:10.0 | 84 | 93 | 94 | 1.2 |
| Example 12 | 80.0:20.0:0 | 85 | 93 | 94 | 0.6 |
| Example 13 | 80.0:20.0:0 | 78 | 86 | 87 | 1.0 |

It is noted from the results of Table 2 that the catalysts produced in accordance with this invention possessd higher NO$_x$ removal activity and lower SO$_2$ oxidizing activity than the catalysts not conforming to the present invention.

EXAMPLES 14–17

Various catalysts were prepared by following the procedure of Example 1, using the TSS-1 powder of Example 1 and varying the components in the catalytic oxides (A).

As raw materials for the catalyst, ammonium salts of vanadium, tungsten and molybdenum, a chloride of tin, and a nitrate of cerium were used.

The catalyst compositions and the results are shown in Table 3.

TABLE 3

| Catalyst | Composition (weight ratio) | NO$_x$ removal efficiency (%) at reaction temperature of | | | SO$_2$ conversion (%) at reaction temperature of 350° C. |
|---|---|---|---|---|---|
| | | 300° C. | 350° C. | 380° C. | |
| Example 14 | TSS-1:V$_2$O$_5$:WO$_3$ = 89:1:10 | 90 | 95 | 96 | 0.3 |
| Example 15 | TSS-1:V$_2$O$_5$:MoO$_3$ = 88:2:10 | 92 | 96 | 97 | 0.7 |
| Example 16 | TSS-1:V$_2$O$_5$:SnO$_2$ = 93:2:5 | 92 | 95 | 96 | 0.6 |
| Example 17 | TSS-1:V$_2$O$_5$:CeO$_2$ = 93:2:5 | 92 | 96 | 97 | 0.7 |

What is claimed is:

1. A catalyst for the purification of an exhaust gas by the removal, through selective reduction, of nitrogen oxides present in the exhaust gas, said catalyst consisting essentially of
   (A) 80 to 95% by weight of an oxidized sulfur containing catalytic oxide obtained by
      thermally treating at 450° C. to 700° C. a compound selected from the group consisting of a binary hydrous oxide of titanium and silicon in the presence of at least one sulfur compound selected from the group consisting of sulfuric acid and ammonium sulfate,
   (B) 0 to 5% by weight of vanadium oxide, and
   (C) 1 to 15% by weight of a catalytic oxide selected from the group consisting of an oxide of at least one metal selected from the group
consisting of tungsten, molybdenum, tin, and cerium, wherein said catalytic oxide (A) containing an oxidized sulfur consists essentially of (a) 40 to 95 parts of titanium, (b) 60 to 5 parts of silicon and zirconium and (c) 1.2 to 7 parts of sulfur, by atomic ratio.

2. The catalyst according to claim 1, consisting essentially of (A) 85 to 95% by weight of said catalytic oxide containing sulfur oxide, (B) 0 to 3% by weight of said vanadium oxide, and (C) 3 to 12% by weight of said catalytic oxide selected from the group consisting of an oxide of at least one metal selected from the group consisting of tungsten, molybdenum, tin and cerium.

3. The catalyst according to claim 1, wherein said catalytic oxide containing sulfur oxide is obtained by thermal treatment performed in the presence of a sulfur compound in a binary hydrous oxide compound consisting essentially titanium and silicon and said catalytic oxide has a composition of Ti:Si:S=40–95:60–5:1.2–7 by atomic ratio.

4. A catalyst according to claim 1, wherein said catalytic oxide containing sulfur oxide has a BET surface area of not less than 60 m$^2$/g.

5. A catalyst according to claim 1, wherein said thermal treatment of said hydrous oxide compound is carried out at a temperature in the range of 500° to 650° C.

6. A process for producing a catalyst for the purification of an exhaust gas by the removal, through selective reduction, of nitrogen oxides present in the exhaust gas, said catalyst consisting essentially of:

(A) 80 to 95% by weight of an oxidized sulfur-containing catalytic oxide, (B) 0 to 5% by weight of vanadium oxide, and (C) 1 to 15% by weight of a catalytic oxide selected from the group consisting of an oxide of at least one metal selected from the group consisting of tungsten, molybdenum, tin, and cerium, said process comprising the steps of
a) thermally treating at 450° C. to 700° C. a binary hydrous oxide compound consisting essentially of titanium and silicon in the presence of at least one sulfur compound selected from the group consisting of sulfuric acid and ammonium sulfate to obtain said oxidized sulfur-containing catalytic oxide (A), and
by mixing said catalytic oxide (A), said vanadium oxide (B) and said catalytic oxide (C).

7. A process according to claim 6, wherein said catalyst for the purification of an exhaust gas consists essentially of (A) 85 to 95% by weight of said catalytic oxide containing an oxidized sulfur, (B) 0 to 3% by weight of said vanadium oxide, and (C) 3 to 12% by weight of said catalytic oxide selected from the group consisting of an oxide of at least one metal selected from the group consisting of tungsten, molybdenum, tin and cerium.

8. A process according to claim 6, wherein said catalytic oxide (A) containing an oxidized sulfur is obtained by thermal treatment performed in the presence of a sulfur compound in a binary hydrous oxide compound of titanium and silicon and said catalytic oxide has a composition of Ti:S=40–95:60–5:1.2–7 by atomic ratio.

9. A process according to claim 6, wherein said catalytic oxide (A) containing an oxidized sulfur is composed of (a) 50 to 90 parts of titanium, (b) 50 to 10 parts of silicon and (c) 1.5 to 5 parts of sulfur, by atomic ratio.

10. A process according claim 6, wherein said catalytic oxide containing an oxidized sulfur has a BET surface area of not less than 60 m$^2$/g.

11. A catalyst for the purification of an exhaust gas by the removal, through selective reduction of nitrogen oxides present in the exhaust gas, said catalyst consisting of (A) 80 to 95% by weight of an oxidized sulfur containing catalytic oxide obtained by
thermally treating at 450° C. to 700° C. a compound selected from the group consisting of a binary hydrous oxide of titanium and silicon in the presence of at least one sulfur compound selected from the group consisting of sulfuric acid and ammonium sulfate, (B) 0 to 5% by weight of vanadium oxide, and (C) 1 to 15% by weight of a catalytic oxide selected from the group consisting of an oxide of at least one metal selected from the group consisting of tungsten, molybdenum, tin, and cerium, wherein said catalytic oxide (A) containing an oxidized sulfur consists of (a) 40 to 95 parts of titanium, (b) 60 to 5 parts of silicon and zirconium and (c) 1.2 to 7 parts of sulfur, by atomic ratio.

12. A process for producing a catalyst for the purification of an exhaust gas by the removal, through selective reduction, of nitrogen oxides present in the exhaust gas, said catalyst consisting of:

(A) 80 to 95% by weight of an oxidized sulfur-containing catalytic oxide, (B) 0 to 5% by weight of vanadium oxide, and (C) 1 to 15% by weight of a catalytic oxide selected from the group consisting of an oxide of at least one metal selected from the group consisting of tungsten, molybdenum, tin, and cerium, said process comprising the steps of
a) thermally treating at 450° C. to 700° C. a binary hydrous oxide compound consisting of titanium and silicon in the presence of at least one sulfur compound selected from the group consisting of sulfuric acid and ammonium sulfate to obtain said oxidized sulfur-containing catalytic oxide (A), and b) mixing said catalytic oxide (A), said vanadium oxide (B) and said catalytic oxide (C).

* * * * *